(12) United States Patent
Kasuya

(10) Patent No.: US 9,588,502 B2
(45) Date of Patent: Mar. 7, 2017

(54) MACHINE TOOL CONTROL DEVICE

(75) Inventor: Hiroshi Kasuya, Saitama (JP)

(73) Assignees: Citizen Watch Co., Ltd., Tokyo (JP);
Citizen Machinery Co., Ltd., Nagano (JP)

( * ) Notice: Subject to any disclaimer, the term of this patent is extended or adjusted under 35 U.S.C. 154(b) by 392 days.

(21) Appl. No.: 14/000,417

(22) PCT Filed: Mar. 15, 2012

(86) PCT No.: PCT/JP2012/056699
§ 371 (c)(1),
(2), (4) Date: Aug. 20, 2013

(87) PCT Pub. No.: WO2012/132933
PCT Pub. Date: Oct. 4, 2012

(65) Prior Publication Data
US 2013/0331956 A1   Dec. 12, 2013

(30) Foreign Application Priority Data

Mar. 30, 2011 (JP) .................................. 2011-075331
Jul. 26, 2011 (JP) .................................. 2011-162786

(51) Int. Cl.
*G05B 19/18*     (2006.01)
*G05B 11/01*     (2006.01)
*G05B 19/4155*   (2006.01)

(52) U.S. Cl.
CPC .............. *G05B 11/01* (2013.01); *G05B 19/18* (2013.01); *G05B 19/4155* (2013.01); *G05B 2219/33077* (2013.01); *G05B 2219/34418* (2013.01)

(58) Field of Classification Search
CPC .................. G05B 19/4155; G05B 2219/34418
USPC ................................ 700/11, 112; 318/568.11
See application file for complete search history.

(56) References Cited

U.S. PATENT DOCUMENTS

| | | | |
|---|---|---|---|
| 5,140,237 A * | 8/1992 | Sasaki .............. | G05B 19/40937 318/568.11 |
| 5,930,141 A * | 7/1999 | Kamiyama .......... | G05B 19/414 700/159 |
| 2005/0060859 A1 | 3/2005 | Shinohara et al. | |
| 2009/0198367 A1* | 8/2009 | Matsumoto ............ | B23Q 39/04 700/112 |

FOREIGN PATENT DOCUMENTS

EP            0 201 081 A2   11/1986

* cited by examiner

*Primary Examiner* — Mohammad Ali
*Assistant Examiner* — Sheela S Rao
(74) *Attorney, Agent, or Firm* — Howson & Howson LLP

(57) ABSTRACT

Provided is a machine tool control device which does not require an operator to enter the execution order of machining programs before testing a machine tool, enabling easy debugging of the machining programs.
A machine tool control device (100) sequentially executes a plurality of machining programs (S1, S2) in a unit of machining program block (S1-1, S1-2, S2-1, S2-2) to a wait command (da1-1, da1-2, da2-1, da2-2) in ascending order of the system number (1, 2) of the machining programs (S1, S2) without executing machining program blocks (S1-1, S1-2, S2-1, S2-2) in parallel between the machining programs (S1, S2).

4 Claims, 11 Drawing Sheets

FIG.4
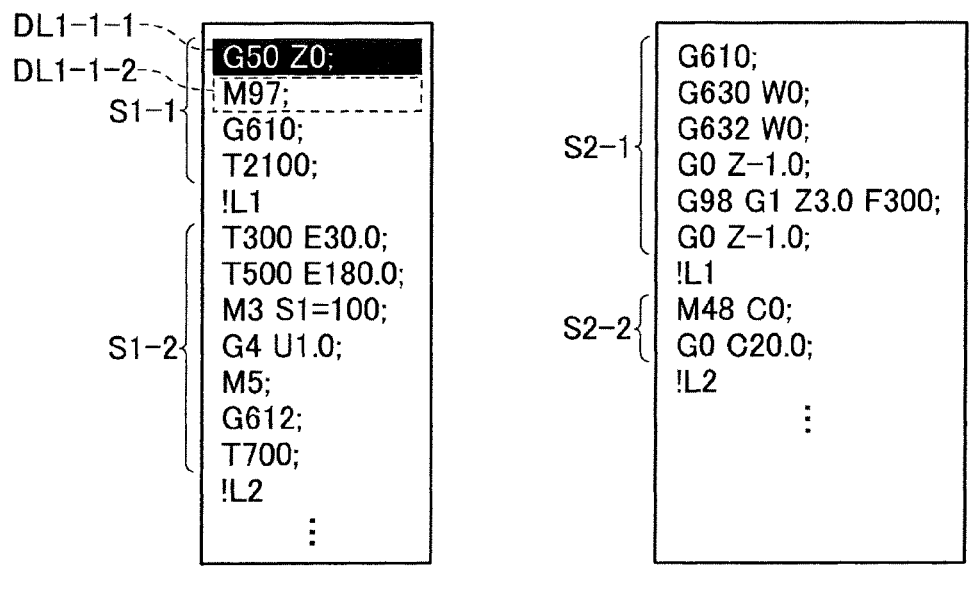
(a)
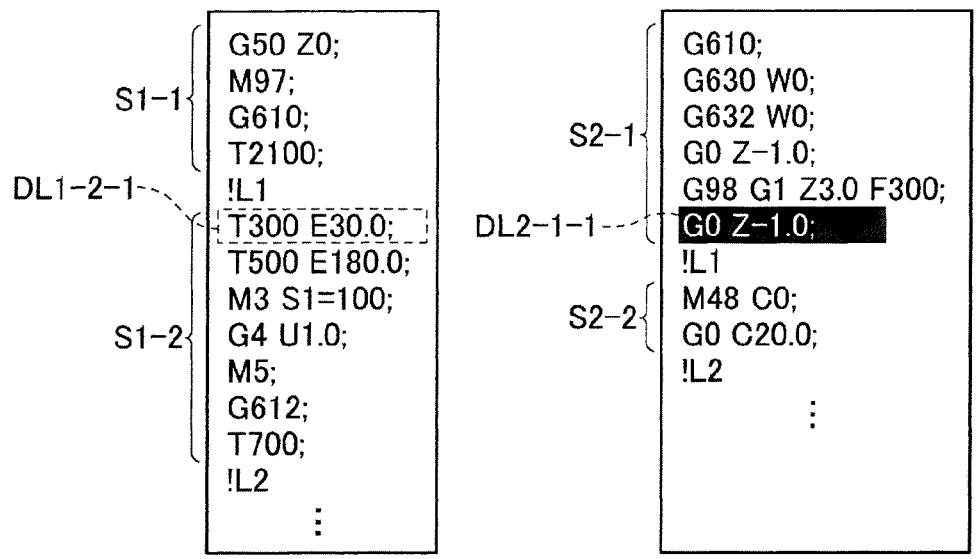
(b)

MACHINE TOOL CONTROL DEVICE

TECHNICAL FIELD

The present invention relates to a machine tool control device used for machine tools such as an NC automatic lathe.

BACKGROUND ART

A conventional machine tool control device is known that is capable of serially executing part programs, or machining programs, corresponding to the control systems of the device when testing the operation of each controlled part of a machine tool, instead of executing the machining programs in parallel between the control systems (see Patent Literature 1, for example).

CITATION LIST

Patent Literature

Patent Literature 1: Japanese Patent Application Laid-Open No. H2-148109 (see Claims and FIGS. 1 to 3)

SUMMARY OF INVENTION

Technical Problem

The conventional machine tool control device, however, has a problem that an operator of the device has to manually enter the execution order of the machining programs before testing the machine tool.

Thus, the technical problem addressed by the present invention, or the object of the present invention, is to provide a machine tool control device which does not force an operator to manually enter the execution order of machining programs before testing a machine tool and thus enables easy debugging of the machining programs.

Solution to Problem

According to a first aspect of the present invention, a machine tool control device has a plurality of control systems for controlling preliminarily allocated drive axes of a machine tool and is capable of operating the machine tool by executing a multisystem program including a plurality of machining programs respectively corresponding to the plurality of control systems. Each of the control systems has a system number. Each of the machining programs includes a wait command for mutually waiting for each other's execution between any of the control systems. The machine tool control device includes sequential execution means for executing an unexecuted portion of each of the machining programs to the wait command in a predetermined order of the control systems, and continuous execution means for sequentially executing the machining programs respectively corresponding to the control systems in a linear manner by recursively executing a cycle of sequential execution in which the first to the last of the plurality of machining programs in an execution order are sequentially executed by the sequential execution means.

According to a second aspect of the present invention, the predetermined order of the control systems is set by the sequential execution means as ascending order of the system number.

According to a third aspect of the present invention, the machine tool control device includes flag set means for setting an executable flag on any of the control systems that has completed its mutual waiting with another control system when the cycle of sequential execution completes, and flag reset means for resetting the executable flag on any of the control system whose machining program has been executed to the wait command. The sequential execution means is configured to execute the machining program of the control system on which the executable flag is set by the flag set means while resetting the execution flag via the flag reset means in the cycle of sequential execution.

According to a fourth aspect of the present invention, the wait command includes a concurrent execution wait command for concurrently executing a plurality of control systems. The machine tool control device includes concurrent execution means for concurrently executing any of the machining programs that have completed their waiting caused by the concurrent execution wait command while the sequential execution means is executing the cycle of sequential execution.

Advantageous Effects of Invention

The machine tool control device in accordance with the first aspect of the present invention includes the sequential execution means for executing an unexecuted portion of each of the machining programs to the wait command in a predetermined order of the control systems to complete a cycle of sequential execution, and the continuous execution means for sequentially executing the machining programs in a linear manner by recursively executing a cycle of sequential execution in which the first to the last of the plurality of machining programs in an execution order are sequentially executed by the sequential execution means. Thus, the machine tool control device can automatically and sequentially execute the processing programs that are otherwise executed concurrently by the control systems, enabling an operator to easily test the machine tool, or debug the machining programs, without entering an execution order of the machining programs.

The machine tool control device in accordance with the second aspect of the present invention can sequentially execute the machining programs to enable efficient debugging of the machining programs.

The machine tool control device in accordance with the third aspect of the present invention is capable of automatically and sequentially executing the machining programs that are otherwise executed concurrently by a plurality of control systems, for example. Thus, the machine tool control device enables an operator to easily test the machine tool, or debug the machining programs, without entering the execution order of the machining programs.

The machine tool control device in accordance with the fourth aspect of the present invention can concurrently execute a plurality of processing programs that need to be executed concurrently for achieving an intended operation via the concurrent execution means, enabling more accurate debugging of the processing programs.

BRIEF DESCRIPTION OF DRAWINGS

FIGS. 4A and 4B are diagrams showing an example of an image displayed on a display unit, the image depicting how the machining program blocks are executed when debugging the machining programs;

FIGS. 11A and 11B are diagrams showing an example of an image displayed on the display unit, the image depicting how the machining programs are executed.

DESCRIPTION OF EMBODIMENTS

A machine tool control device as an embodiment of the present invention will now be described.

In the following description, the term "machining program block" refers to a group of commands that are included in a machining program and constitute a certain unit of operation.

In embodiments 1 and 2 described below, the execution order of the control systems may be ascending or descending order of the system number, or any other order arbitrarily entered and set by an operator as long as the execution order is predetermined.

Embodiment 1

Figure 1:
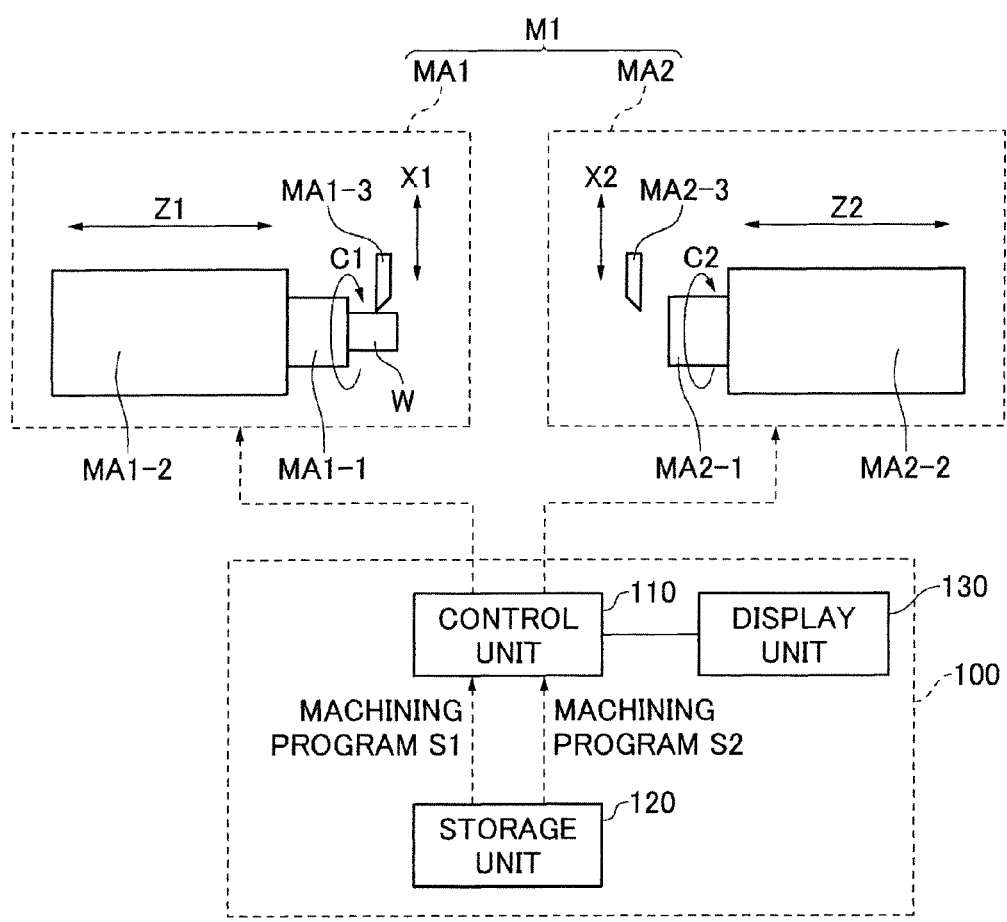
FIG. 1 is a block diagram showing the configuration of a machine tool control device as a first embodiment of the present invention.

As shown in FIG. 1, a machine tool control device 100 as a first embodiment of the present invention includes a control unit 110, a storage unit 120, and a display unit 130 such as a display. The control unit 110 is an embodiment of both sequential execution means and continuous execution means of the present invention, and exerts the function of the former and the latter means via software or hardware configuration on a timely manner in accordance with a program stored in advance. The machine tool control device 100 has two control systems: a first control system MA1 and a second control system MA2. These control systems are identified with system numbers 1 and 2, respectively. A plurality of driving axes of a target machine tool M1 belong to either the control systems MA1 or MA2 and are controlled independently between the control systems MA1 and MA2. On the basis of a multisystem program that includes machining programs S1 and S2 respectively corresponding to the control systems MA1 and MA2 and is stored in the storage unit 120, the machine tool control device 100 operates via the control unit 110 the control systems MA1 and MA2 independently from each other to machine a work W.

In this embodiment, a rotary drive axis C1 of a front main spindle MA1-1 that supports the work W, a moving drive axis Z1 of a front headstock MA1-2 that rotatably supports the front main spindle MA1-1, and a moving drive axis X1 of a working tool MA1-3 belong to the first control system MA1. The axis Z1 is in parallel with the axial direction of the front main spindle MA1-1, and the axis X1 is perpendicular to the axis Z1. The machine tool control device 100 operates the front main spindle MA1-1, the front headstock MA1-2, and the working tool MA1-3 by controlling via the control unit 110 the drive axes C1, X1, and Z1 that belong to the first control system MA1 in accordance with the machining program S1 to perform machining or the like of the work W.

A rotary drive axis C2 of a back main spindle MA2-1, a moving drive axis Z2 of a back headstock MA2-2 that rotatably supports the back main spindle MA2-1, and a moving drive axis X2 of a working tool MA2-3 belong to the second control system MA2. The axis Z2 is in parallel with the axis Z1, and the axis X2 is in parallel with the axis X1. The machine tool control device 100 operates the back main spindle MA2-1, the back headstock MA2-2, and the working tool MA2-3 by controlling via the control unit 110 the drive axes C2, X2, and Z2 that belong to the second control system MA2 in accordance with the machining program S2 to perform machining or the like of the work W.

Figure 2:
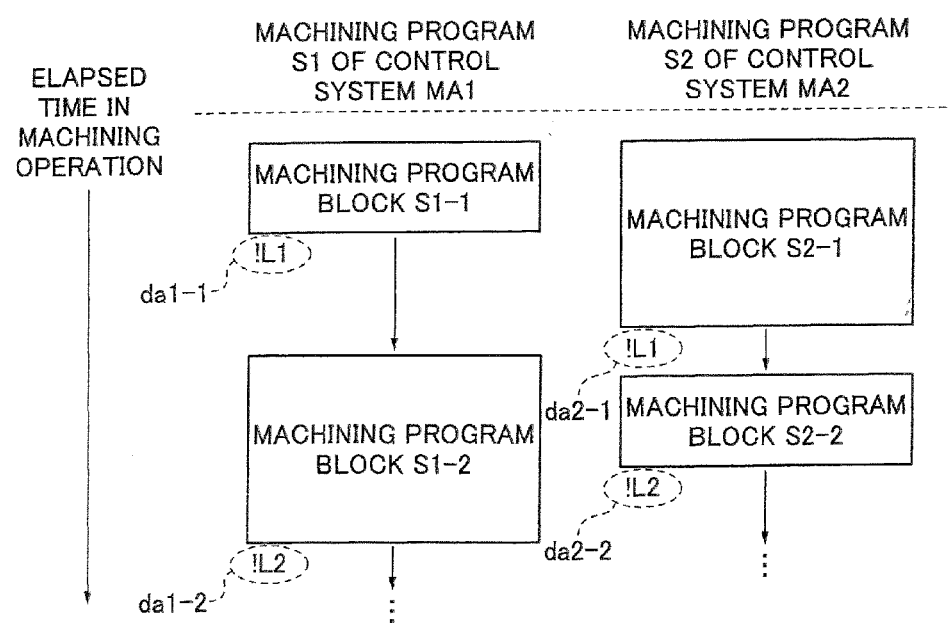
FIG. 2 is a timing chart schematically showing how machining program blocks of machining programs are executed when machining a work.

The method of the machine tool control device 100 for controlling the machine tool M1 will now be described in detail with reference to FIGS. 1 to 4. As shown in FIG. 2, the machining program S1 includes machining program blocks S1-1 and S1-2 serially written for making the drive axes belonging to the control system MA1 perform a predetermined operation. The machining program S2 includes machining program blocks S2-1 and S2-2 serially written for making the drive axes belonging to the control system MA2 perform a predetermined operation. In order to execute the machining program blocks S1-2 and S2-2 after waiting for the completion of executing the machining program blocks S1-1 and S2-1, wait commands da1-1 and da2-1 are provided between the machining program blocks S1-1 and S1-2 and between the machining program blocks S2-1 and S2-2, respectively. Also, in order to execute the succeeding machining program blocks (not shown) succeeding to the machining program blocks S1-2 and S2-2 after waiting for the completion of executing the machining program blocks S1-2 and S2-2, wait commands da1-2 and da2-2 are provided immediately after the machining program blocks S1-2 and S2-2, respectively. As shown in FIG. 2, the machine tool control device 100 concurrently executes the machining programs of the control systems MA1 and MA2 in parallel with each other in a normal operation of the machine tool M1 for machining the work W. Because of the wait commands da1-1 and da2-1, however, the machining program blocks S1-2 and S2-2 are executed in parallel with each other after waiting for the completion of executing the machining program blocks S1-1 and S2-1. The succeeding program blocks of the machining programs S1 and S2 are similarly executed after waiting for the completion of executing preceding machining program blocks because a wait command is provided after each of the machining program blocks. This enables the machine tool control device 100 to control the drive axes belonging to the control system MA1 and the drive axes belonging to the control system MA2 concurrently and independently from each other to efficiently machine the work W.

Figure 3:
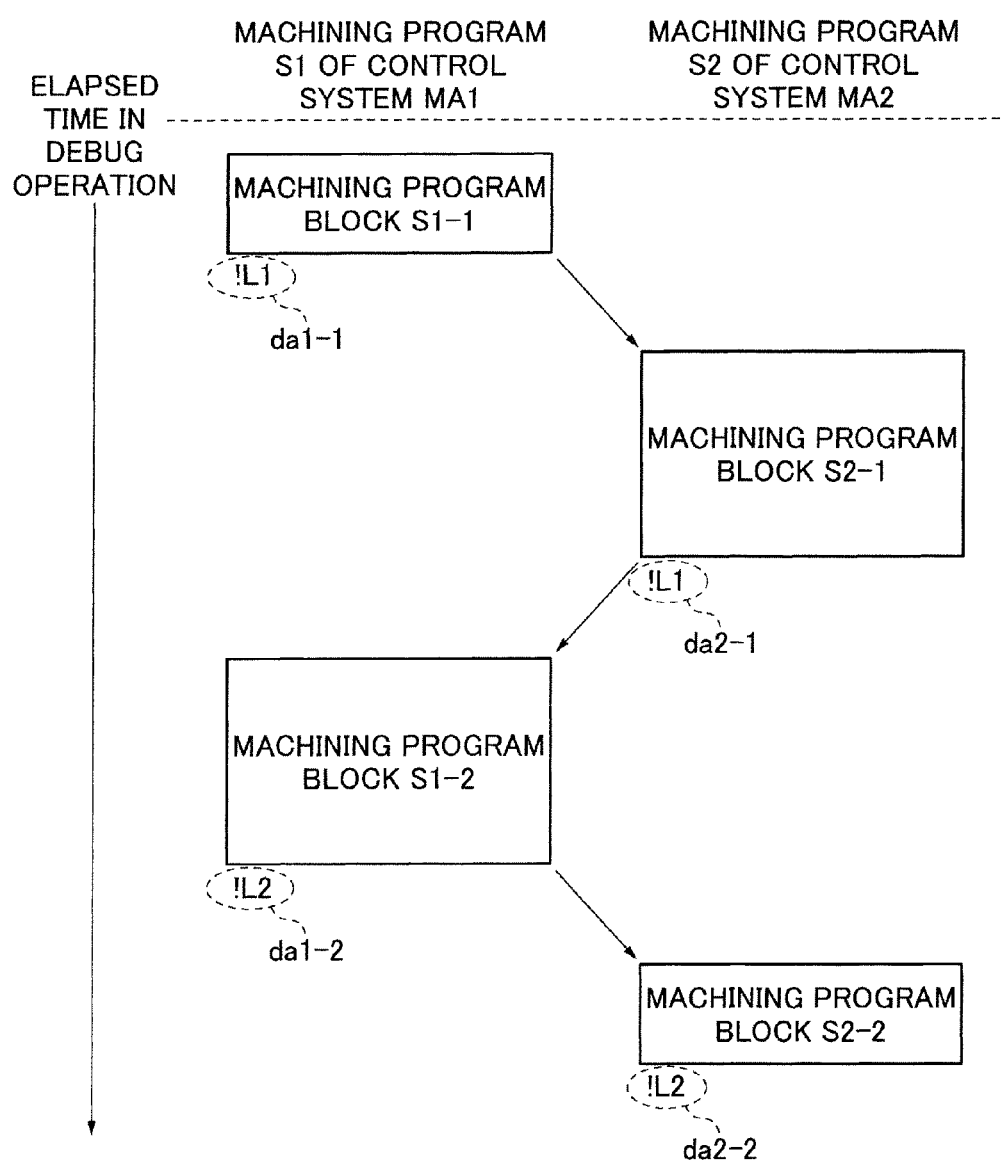
FIG. 3 is a timing chart schematically showing one example of how the machining program blocks are executed when debugging the machining programs.

The control unit 110 of the machine tool control device 100 acts as the sequential execution means. As shown in FIG. 3, the control unit 110 firstly executes an unexecuted machining program block in a control system having a smaller system number (that is, the machining program block S1-1 in the control system MA1 having the system number 1) to a wait command (da1-1), and then executes an unexecuted machining program block in a control system having a larger system number (that is, the machining program block S2-1 in the control system MA2 having the system number 2) to a wait command (da2-1). Because the control unit 110 acts as the sequential execution means, unexecuted machining program blocks of the machining programs S1 and S2 respectively corresponding to the control systems MA1 and MA2 are sequentially executed in a predetermined order of the control systems. In the present embodiment, the machining program blocks are sequentially executed in ascending order of the system number of the control systems. A cycle of sequential execution completes when the machining program block S1-1 of the machining program S1 corresponding to the control system MA1 and the machining program block S2-1 of the machining program S2 corresponding to the control system MA2 are sequentially executed in ascending order of the system number. The control unit 110 then acts as the continuous execution means and recursively executes the cycle of sequential execution via the sequential execution means. The unexecuted machining program block S1-2 in the control system MA1 having the smaller system number 1 is executed to the wait command da1-2, and the unexecuted machining program block S2-2 in the control system MA2 having the larger system number 2 is then executed to the wait command da2-2. As a result, the machining program blocks S1-1, S2-1, S1-2, and S2-2 are sequentially executed to the wait commands Da1-1, da2-1, da1-2, and da2-2, respectively. In the present embodiment, the sequential execution mean is configured to set the execution order of the control systems as ascending order of the system number. The role of the sequential execution means and the role of the continuous execution means are played by the control unit 110 on the basis of software or hardware configuration.

An operator can arbitrarily activate the continuous execution means by using a switch or any other means. For example, if an operator would like to execute the multisystem program on trial, he or she can instruct the control unit 110 to act as the continuous execution means to recursively execute the cycle of sequential execution via the sequential execution means so that the machining programs of the control systems MA1 and MA2 are automatically executed in a sequential manner without being executed in parallel with each other. As a result, the operator is freed from the burden of monitoring the control systems MA1 and MA2 simultaneously when debugging the machining programs. Instead, the operator can check the operation of control systems MA1 and MA2 separately and debug the machining programs S1 and S2 easily and independently from each other. When the machine tool M1 is operated while the control unit 110 is acting as the continuous execution means, the execution order of the machining program blocks is automatically determined on the basis of the execution order of the control systems and the wait commands. Thus, the machining program blocks can be easily executed in a sequential manner without entering the execution order thereof manually or via any other means.

The image displayed on the display unit 130 of the machine tool control device 100 when the continuous execution means is in operation will now be described with reference to FIGS. 4A and 4B. FIGS. 4A and 4B show the machining programs S1 and S2 dynamically displayed on the display unit 130 as time advances when the continuous execution means is in operation.

As shown in FIGS. 4A and 4B, program lines DL1-1-1 and DL2-1-1 that are being executed are displayed on a reversed background, for example. Program lines DL1-1-2 and DL1-2-1 that will be executed next are displayed in flashing letters (indicated with a dotted line). In other words, due to the control of the continuous execution means, the program line that is being executed and the program line that will be executed next are displayed on the display unit 130 such that an operator can distinguish those program lines from each other.

The operator can thus easily recognize how the machining programs S1 and S2 are executed. Particularly, when the program line DL2-1-1 is in execution as shown in FIG. 4B, the program line that will be executed next is DL1-2-1, which is included in the machining program block S1-2 rather than the machining program block S2-1 in which the program line DL-2-1-1 is included. In such case, the above described display enables easy recognition of the program line DL1-2-1 that will be executed next.

Embodiment 2

Figure 5:
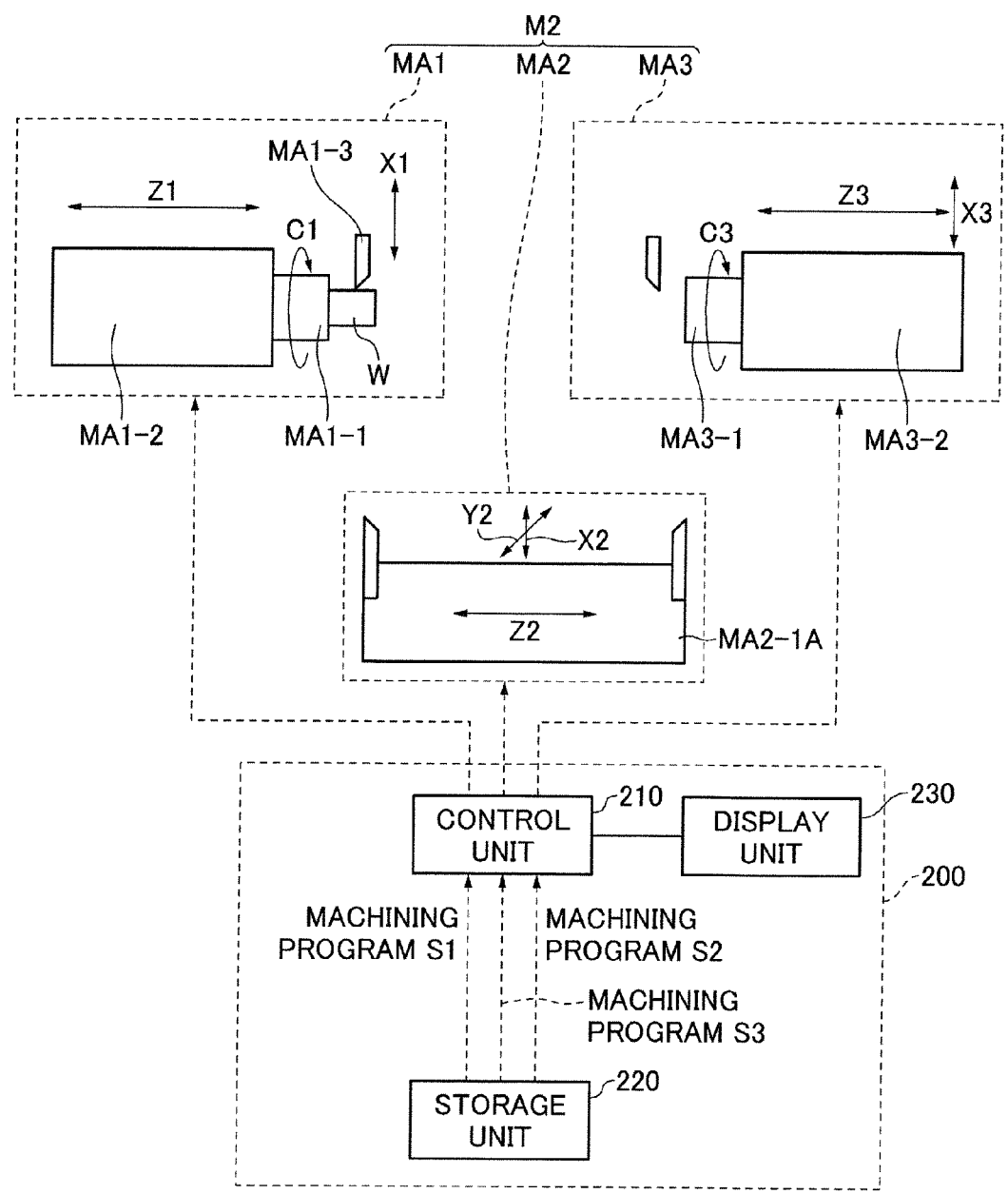
FIG. 5 is a block diagram showing the configuration of a machine tool control device as a second embodiment of the present invention.

As shown in FIG. 5, a machine tool control device 200 as a second embodiment of the present invention includes a control unit 210, a storage unit 220, and a display unit 230 such as a display for showing a machining program in execution. The control unit 210 is an embodiment of sequential execution means, continuous execution means, flag set means, flag reset means, and concurrent executing means of the present invention and exerts the function of each of the means via hardware or software configuration on a timely manner in accordance with a program stored in advance. The machine tool control device 200 has three control systems: a first control system MA1, a second control system MA2, and a third control system MA3. These control systems are identified with system numbers 1, 2, and 3, respectively. A plurality of drive axes of a machine tool M2 belong to either the control systems MA1, MA2, or MA3 and are controlled independently between the control systems MA1, MA2, and MA3. On the basis of a multisystem program that includes machining programs S1, S2, and S3 respectively corresponding to the control systems MA1, MA2, and MA3 and is stored in the storage unit 220, the machine tool control device 200 operates via the control unit 210 the control systems MA1, MA2, and MA3 independently from each other to machine a work W.

In this embodiment, a rotary drive axis C1 of a front main spindle MA1-1 that supports the work W, a moving drive axis Z1 of a front headstock MA1-2 that rotatably supports the front main spindle MA1-1, and a moving drive axis X1 of a working tool MA1-3 belong to the first control system MA1. The axis Z1 is in parallel with the axial direction of the front main spindle MA1-1, and the axis X1 is perpendicular to the axis Z1. The machine tool control device 200 operates the front main spindle MA1-1, the front headstock MA1-2, and the working tool MA1-3 by controlling via the control unit 210 the drive axes C1, X1, and Z1 that belong to the first control system MA1 in accordance with the machining program S1 to perform machining or the like of the work W.

Moving drive axes Z2, X2, and Y2 of a turret MA2-1A belong to the second control system MA2. The axis Z2 is in parallel with the axis Z1, the axis X2 is in parallel with the axis X1, and the axis Y2 is perpendicular to the axes X2 and Z2. The machine tool control device 200 operates the turret MA2-1A by controlling via the control unit 210 the drive axes X2, Y2, and Z2 that belong to the second control system MA2 in accordance with the machining program S2 to perform machining or the like of the work W.

A rotary drive axis C3 of a back main spindle MA3-1, a moving drive axis Z3 of a back headstock MA3-2 that rotatably supports the back main spindle MA3-1, and a moving drive axis X3 of the back headstock MA3-2 belong to the third control system MA3. The axis Z3 is in parallel with the axes Z1 and Z2, and the axis X3 is in parallel with the axes X1 and X2. The machine tool control device 200 operates the back main spindle MA3-1 and the back headstock MA3-2 by controlling via the control unit 210 the drive axes C3, X3, and Z3 that belong to the third control system MA3 in accordance with the machining program S3 to perform machining or the like of the work W.

The method of the machine tool control device 200 for controlling the machine tool M2 will now be described in detail.

Figure 6:
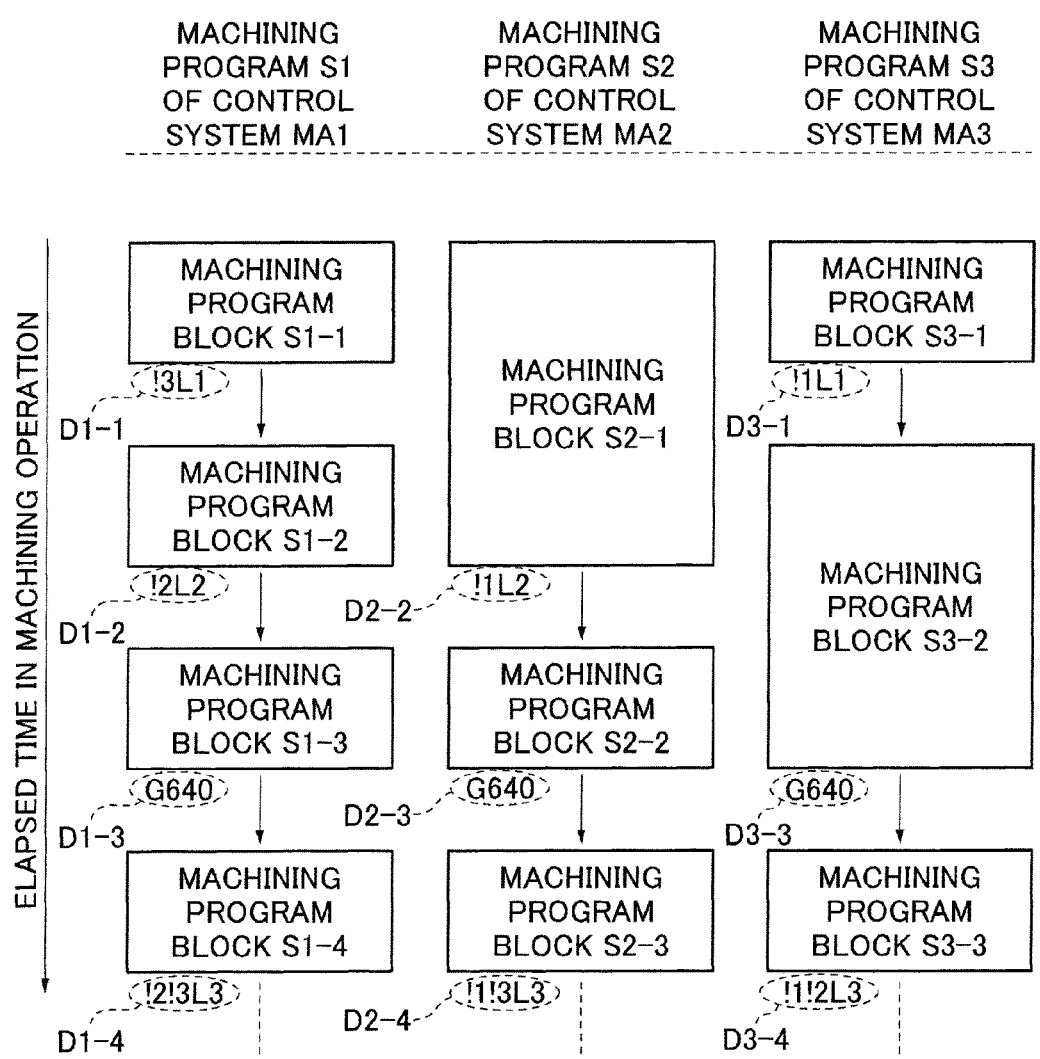
FIG. 6 is a timing chart schematically showing how machining program blocks of machining programs are executed when machining a work.

In the case of the multisystem program shown in FIG. 6, the machining program S1 includes machining program blocks S1-1, S1-2, S1-3, and S1-4 serially written for making the drive axes belonging to the control system MA1 perform a predetermined operation. The machining program S2 includes machining program blocks S2-1, S2-2, and S2-3 serially written for making the drive axes belonging to the control system MA2 perform a predetermined operation. The machining program S3 includes machining program blocks S3-1, S3-2, and S3-3 serially written for making the drive axes belonging to the control system MA3 perform a predetermined operation. Wait commands D1-1, D1-2, D1-3, D1-4, D2-2, D2-3, D2-4, D3-1, D3-3, and D3-4 are respectively provided immediately after the machining program blocks S1-1, S1-2, S1-3, S1-4, S2-1, S2-2, S2-3, S3-1, S3-2, and S3-3.

Any wait command in one machining program is mutually related to another wait command(s) in another machining program(s) for mutually waiting for each other's execution between the control systems corresponding to the machining programs. In the present embodiment, the wait commands D1-1 and D3-1, the wait commands D1-2 and D2-2, the wait commands D1-3, D2-3, and D3-3, and the wait commands D1-4, D2-4, and D3-4 are respectively mutually related to each other. In a normal operation of the machine tool M2 for processing the work W, the machine tool control device 200 concurrently executes the machining programs of the control systems in parallel with each other. Because a wait commands is provided immediately after each machining program block, however, any machining program block is executed after waiting for the completion of executing another machining program block on the basis of mutually related wait commands. In the present embodiment, the machining program blocks S1-1, S2-1, and S3-1 are executed in parallel to the wait commands D1-1, D2-2, and D3-1, respectively. On the basis of the mutually related wait commands D1-1 and D3-1, the completion of executing the machining program block S1-1 and S3-1 is waited. When the execution of the machining program blocks S1-1 and S3-1 completes, the machining program blocks S1-2 and S3-2 are then executed in parallel to the wait commands D1-2 and D3-3, respectively. Meanwhile, after the completion of executing the machining program block S2-1, the completion of executing the machining program block S1-2 is waited because the wait command D2-2 is mutually related to the wait command D1-2. When the execution of both of the machining program blocks S1-2 and S2-1 completes, the machining program blocks S1-3 and S2-2 are then executed in parallel to the wait commands D1-3 and D2-3, respectively. Because the wait commands D1-3 and D2-3 are mutually related to the wait command D3-3, the completion of executing the machining program block S3-2 is waited. After the completion of executing the machining program blocks S1-3, S2-2, and S3-2, the machining program blocks S1-4, S2-3, and S3-3 are executed in parallel to the wait commands D1-4, D2-4, and D3-4, respectively. The succeeding machining program blocks are similarly executed until the end of the multisystem program. This enables the machine tool control device 200 to control the drive axes belonging to the control systems MA1, MA2, and MA3 concurrently and independently from each other while mutually waiting for each other's execution between the control systems MA1, MA2, and MA3 on the basis of the wait commands to efficiently machine the work W.

A machine tool control method executed by the machine tool control device 200 when testing the machine tool M2, or debugging the machining programs S1, S2, and S3, will now be described. In the following description, the term "concurrent execution wait command" refers to a wait command used for concurrently executing a plurality of control systems in parallel. This includes a wait command that is used when drive axes belonging to different control systems must be controlled concurrently for carrying out a particular machining operation, such as an "overlapping machining pattern command" used for mutually waiting for each other's execution between the control systems MA1 and MA2 when the drive axes belonging to the first control system MA1 and the drive axes belonging to the second control system MA2 need to be overlappingly controlled. In the present embodiment, the wait commands D1-3, D2-3, and D3-3 for concurrently executing the machining program blocks S1-4, S2-3, and S3-3 are concurrent execution wait commands.

The control unit 210 acts as sequential execution means in accordance with a program stored in advance. As seen in the flow chart shown in FIGS. 7 and 8, the control unit 210 sets an executable flag on each of the control systems MA1, MA2, and MA3 (Step 1). Next, the control unit 210 determines whether a wait command is a concurrent execution wait command (Step 2). If it is not, then the control unit 210 determines whether the executable flag is set on the control system MA1 (Step 3). If it is set, a machining program block of the machining program S1 corresponding to the first control system MA1 is executed (Step 4) to a wait command (Step 5). The control unit 210 then resets the executable flag on the first control system MA1 (Step 6). If it is determined in Step 3 that the executable flag is not set, the process goes to Step 7.

The control unit 210 determines whether an executable flag is set on the second control system MA2 (Step 7). If it is set, a machining program block of the machining program S2 corresponding to the second control system MA2 is executed (Step 8) to a wait command (Step 9). The control unit 210 then resets the executable flag on the second control system MA2 (Step 10). If it is determined in Step 7 that the executable flag is not set, the process goes to Step 11.

The control unit 210 determines whether an executable flag is set on the third control system MA3 (Step 11). If it is set, a machining program block of the machining program S3 corresponding to the third control system MA3 is executed (Step 12) to a wait command (Step 13). The control unit 210 then resets the executable flag on the third control system MA3 (Step 14). If it is determined in step 11 that the executable flag is not set, the process goes to Step 15.

Next, the control unit 210 determines whether it needs to stop acting as the sequential execution means (Step 15). If it does not, then the control unit 210 sets an executable flag on both the control systems MA1 and MA3 whose mutual waiting has been completed (step 16), and the process goes back to Step 2. If it is determined in Step 2 that a wait command is a concurrent execution wait command, machining program blocks of machining programs which should be executed concurrently are executed concurrently to a wait command in each of the machining programs (Step 17), and the executable flag is reset on each of the control systems to which the machining programs correspond (Step 18). Accordingly, when debugging the multisystem program, unexecuted machining program blocks of the machining programs S1, S2, and S3 can be sequentially executed in a predetermined order of the control systems MA1, MA2, and MA3 by making the control unit 210 act as the sequential execution means. In the present embodiment, the machining program blocks are sequentially executed in ascending order of the system number. One cycle of sequential execution completes when the machining programs S1, S2, and S3 are sequentially executed in ascending order of the system number of the control systems MA1, MA2, and MA3. Then, in Step 16, an executable flag is set on any control systems whose mutual waiting with another control system has been completed. Thus, in the cycle of sequential execution, the sequential execution means can execute the machining programs corresponding to the control systems on which the executable flag is set and then reset the executable flag in Step 6, 10 or 14. The control unit 210 also acts as the flag set means in Step 16, and acts as the flag reset means in Steps 6, 10, and 14. When the control unit 210 acts as the sequential execution means and it is determined that a wait command is a concurrent execution wait command, the control unit 210 concurrently executes machining programs (machining program blocks) of the control systems which should be executed concurrently in Step 17. In Steps 2 and 17, the control unit 210 acts as the concurrent execution means for concurrently executing machining programs of the control systems whose mutual waiting on the basis of a concurrent execution wait command has been completed. In this case, the control unit 210 acts as the flag reset means in Step 18 as well. Because the control unit 210 acts as both the sequential execution means and the concurrent execution means, it is possible to concurrently execute machining programs of control systems whose mutual waiting on the basis of a concurrent execution wait command has been completed.

Figure 9:
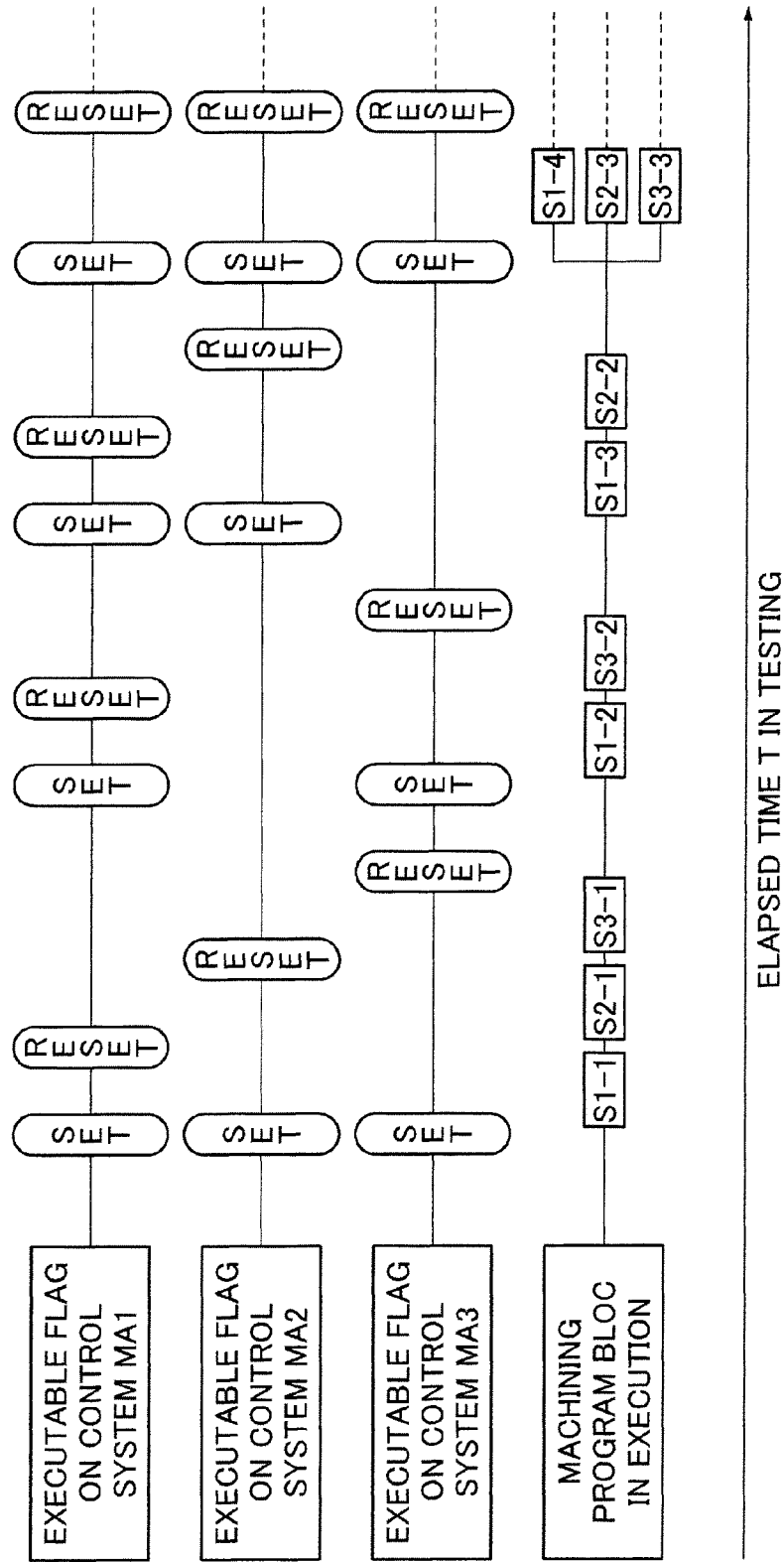
FIG. 9 is a timing chart showing the timing of setting and resetting an executable flagon each control system along with machining program blocks that are in execution.
Figure 10:
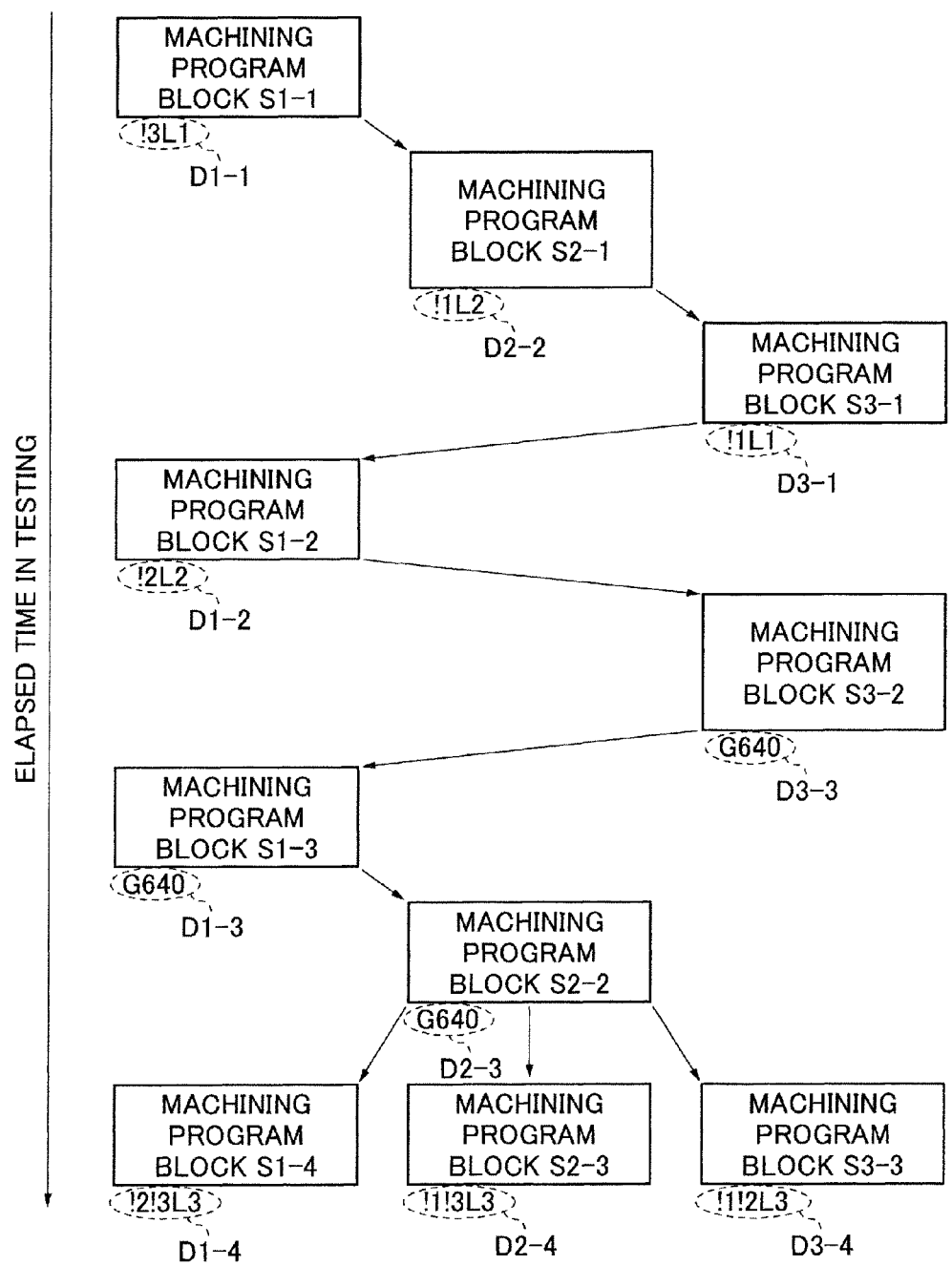
FIG. 10 is a timing chart schematically showing one example of how the machining program blocks are executed when debugging the machining programs.

In the case of the multisystem program shown in FIG. 6, because the control unit 210 acts as the sequential execution means, the first machining program blocks S1-1, S2-1, and S3-1 of the machining programs S1, S2, and S3, respectively, are sequentially executed in the processing order of the control systems MA1, MA2, and MA3 to complete one cycle of sequential execution, as shown in FIGS. 9 and 10. When another cycle of sequential execution is executed, only the machining program blocks S1-2 and S3-2 of the machining programs S1 and S3, respectively, are sequentially executed because an executable flag is set on the control systems MA1 and MA3. Execution of the machining program S2 is skipped because an executable flag is not set on the control system MA2. Similarly, when yet another cycle of sequential execution is executed, only the machining program blocks S1-3 and S2-2 of the machining programs S1 and S2, respectively, are sequentially executed because an executable flag is set on the control systems MA1 and MA2. Execution of the machining program S3 is skipped because an executable flag is not set on the control system MA3. When still another cycle of sequential execution is executed, the machining program blocks S1-4, S2-4, and S3-4 of the machining programs S1, S2, and S3, respectively, are concurrently executed because the wait commands D1-3, D2-3, and D3-3 are concurrent execution wait commands. The succeeding machining program blocks are similarly executed by recursively executing the cycle of sequential execution.

In the present embodiment, the continuous execution means handles the return from Step 16 to Step 2 and recursively executes the cycle of sequential execution via the sequential execution means.

In accordance with an instruction entered by an operator via a switch or the like, the machine tool control device 200 can arbitrarily make the control unit 210 act as the sequential execution means, enabling automatic and sequential execution of the machining program blocks of the machining programs S1, S2, and S3, which are otherwise executed in parallel when processing the work W. Because the execution order of the machining program blocks is automatically determined on the basis of the execution order of the control systems MA1, MA2 and MA3, the wait commands D1-1, D1-2, D1-3, D1-4, D2-2, D2-3, D2-4, D3-1, D3-3 and D3-4, and the executable flags, the operator does not need to enter the execution order of the machining program blocks manually or by any other means. Thus, test of the machine tool M2, or debugging of the machining programs S1, S2, and S3, can be easily carried out.

This eliminates the burden of monitoring the control systems MA1, MA2, and MA3 simultaneously when debugging the multisystem program and enables an operator to debug the machining programs S1, S2, and S3 easily in a mutually-independent manner by checking the operation of the control systems MA1, MA2, and MA3 independently.

Because the control unit 210 also acts as the concurrent execution means, a plurality of machining programs can be concurrently executed for increasing the accuracy of debugging when a plurality of drive axes belonging to different control systems need to be operated concurrently for carrying out a desired machining operation, such as when a plurality of drive axes are overlappingly operated to process the work W. Even though the present embodiment has three control systems, a machine tool control device according to the present invention may have two, four, or more control systems and can sequentially execute machining program blocks of machining programs respectively corresponding to the control systems while concurrently executing some of the machining program blocks that should to be executed concurrently.

Figure 11:
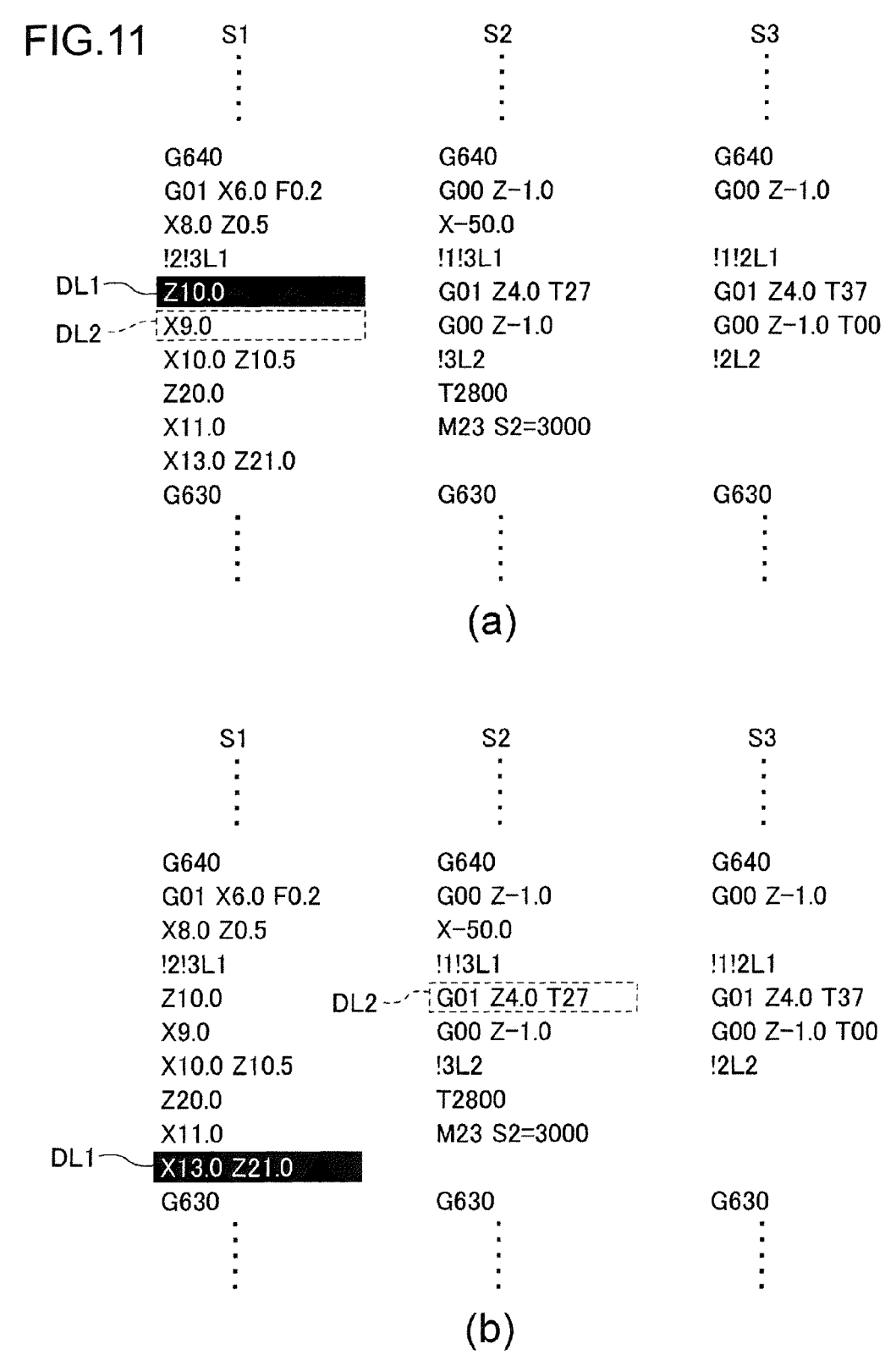

When the multisystem program is being executed, the display unit 230 displays the machining programs S1, S2, and S3 respectively corresponding to the control systems MA1, MA2, and MA3, as shown in FIGS. 11A and 11B. The display unit 230 is configured, for example, to highlight a program line DL1 that is being executed with a reversed background, and to flash a program line DL2 that is to be executed next (shown with a dotted line) for distinguishing the program line DL2 from the program line D1 in execution.

This enables an operator to easily check the execution status of the machining programs S1, S2, and S3 in visual observation. Particularly, when the multisystem program is in execution and a program line of the machining program S1 immediately before a wait command is being executed, that program line becomes the DL1 and another program line of another machining program S2 becomes the DL2, as shown in FIG. 11B. Thus, the above described display on the display unit 230 enables easy recognition of the program line DL2 of the machining program S2 that will be executed next.

Figure 7:
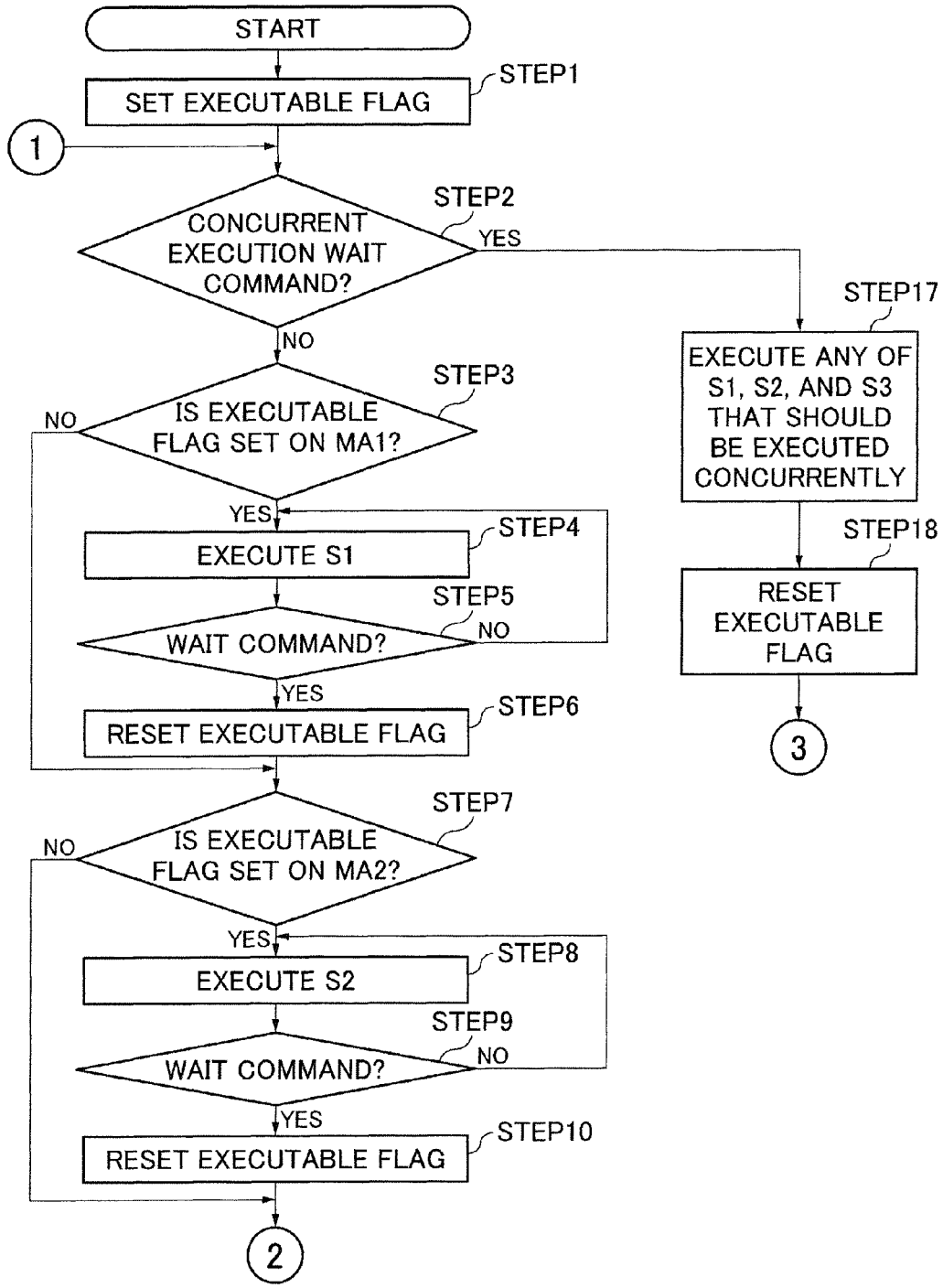
FIG. 7 is a flowchart of the debug operation of the machine tool control device as the second embodiment of the present invention.
Figure 8:
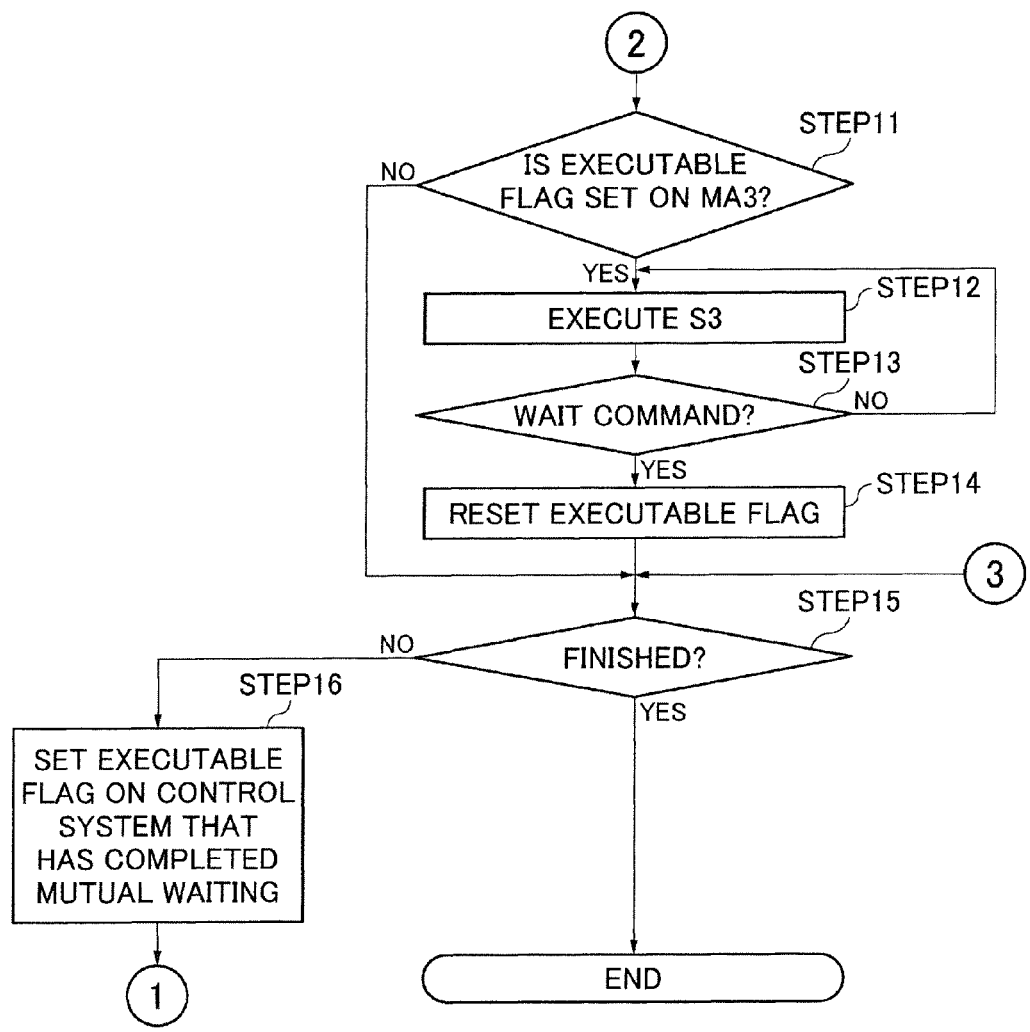
FIG. 8 is a flowchart of the debug operation of the machine tool control device as the second embodiment of the present invention.

REFERENCE SIGNS LIST 100, 200 Machine tool control device
110, 210 Control unit
120, 220 Storage unit
130, 230 Display unit
DL1-1-1, DL1-1-2, DL1-2-1, DL2-1-1 Program line
da1-1, da1-2, da2-1, da2-2, D1-1, D1-2, D1-3, D1-4, D2-2, D2-3, D2-4, D3-1, D3-3, D3-4 Wait command
M1, M2 Machine tool
MA1, MA2, MA3 Control system
MA1-1 Front main spindle
MA1-2 Front headstock
MA1-3, MA2-3 Working tool
MA2-1, MA3-1 Back main spindle
MA2-1A Turret
MA2-2, MA3-2 Back headstock
S1, S2, S3 Machining program
S1-1, S1-2, S1-3, S1-4, S2-1, S2-2, S2-3, S3-1, S3-2, S3-3 Machining program block
W Work
FIG. 1
110 Control Unit
120 Storage Unit
130 Display Unit
S1, S2 Machining Program
FIG. 2
Machining Program S1 of Control System MA1
Machining Program S2 of Control System MA2
S1-1, S1-2, S2-1, S2-2 Machining Program Block
Elapsed Time in Machining Operation
FIG. 3
Machining Program S1 of Control System MA1
Machining Program S2 of Control System MA2
S1-1, S1-2, S2-1, S2-2 Machining Program Block
Elapsed Time in Debug Operation
FIG. 5
210 Control Unit
220 Storage Unit
230 Display Unit
S1, S2, S3 Machining Program
FIG. 6
Machining Program S1 of Control System MA1
Machining Program S2 of Control System MA2
Machining Program S3 of Control System MA3
S1-1, S1-2, S1-3, S1-4, S2-1, S2-2, S2-3, S3-1, S3-2, S3-3
Machining Program Block
Elapsed Time in Machining Operation
FIG. 7
Start
Step 1 Set Executable Flag
Step 2 Concurrent Execution Wait Command?
Step 3 Is Executable Flag Set on MA1?
Step 4 Execute S1
Step 5 Wait Command?
Step 6 Reset Executable Flag
Step 7 Is Executable Flag Set on MA2?
Step 8 Execute S2
Step 9 Wait Command?
Step 10 Reset Executable Flag
Step 17 Execute any of S1, S2, and S3 that should be Executed Concurrently
Step 18 Reset Executable Flag
FIG. 8
Step 11 is Executable Flag Set on MA3?
Step 12 Execute S3
Step 13 Wait Command?
Step 14 Reset Executable Flag
Step 15 Finished?
Step 16 Set Executable Flag on Control System that has Completed Mutual Waiting
End
FIG. 9
Executable Flage on Control System MA1
Executable Flag on Control System MA2
Executable Flag on Control System MA3
Machining Program Block in Execution
Elapsed Time T in Testing
FIG. 10
Machining Program S1 of Control System MA1
Machining Program S2 of Control System MA2
Machining Program S3 of Control System MA3
S1-1, S1-2, S1-3, S1-4, S2-1, S2-2, S2-3, S3-1, S3-2, S3-3
Machining Program Block
Elapsed Time in Testing

The invention claimed is:

1. A machine tool control device having a plurality of control systems for controlling preliminarily allocated drive axes of a machine tool and capable of operating the machine tool by executing a multisystem program including a plurality of machining programs respectively corresponding to the plurality of control systems and controlled independently of each other by their respective corresponding control systems, each of the plurality of control systems having a system number, each of the plurality of machining programs being composed of multiple program portions, said machining programs including wait commands for causing each program portion of each of said plurality of machining programs to wait, before commencing its own execution, for completion of the execution of at least one program portion in a program corresponding to another one of said control systems, the machine tool control device comprising:

sequential execution means for executing a cycle of sequential execution in which unexecuted portions of each of the plurality of machining programs, each of said portions being a part of a machining program corresponding to a different one of said control systems, are executed, each to a wait command, in a predetermined order of the plurality of control systems; and continuous execution means for sequentially executing program portions of machining programs respectively corresponding to the plurality of control systems in a linear manner by causing said sequential execution means to execute recursively a cycle of sequential execution, in which, in each said recursively executed cycle, plural machine program portions, each being a part of a machining program corresponding to a different one of said control systems, are executed, and in which, in a plurality of said recursively executed cycles, a first to last of the plural machining portions in an execution order are sequentially executed by the sequential execution means by starting each of said plurality of machining program portions following said first of said machining program portions in response to the wait command of an immediately preceding one of said plurality of machining program portions and only after said wait command of an immediately preceding one of said plurality of machining program portions is executed.

2. The machine tool control device according to claim 1, wherein the predetermined order of the plurality of control systems is set by the sequential execution means in an ascending order of the system numbers.

3. The machine tool control device according to claim 1, wherein the machine tool control device comprises:
   flag set means for setting an executable flag on any of the plurality of control systems that has completed its mutual waiting with another control system when cycle of sequential execution is completed; and
   flag reset means for resetting the executable flag on any of the plurality of control systems whose machining program has been executed to the wait command,
   said sequential execution means being configured to execute the machining program of the control system on which the executable flag is set by the flag set means while resetting the executable flag via the flag reset means in the cycle of sequential execution.

4. The machine tool control device according to claim 3, wherein the machine tool control device comprises concurrent execution means for concurrently executing at least two machining program portions of said plurality of machining programs.

\* \* \* \* \*